Patented Aug. 29, 1944

2,357,226

UNITED STATES PATENT OFFICE 2,357,226

STABILIZED DIAZO PRINTING PASTES

Swanie S. Rossander, Chiles E. Sparks, and Carl W. Maynard, Jr., Wilmington, Del., assignors to E. I. du Pont de Nemours & Company, Wilmington, Del., a corporation of Delaware No Drawing. Application December 29, 1943, Serial No. 516,054

4 Claims. (Cl. 8—71)

This is a continuation-in-part of application Serial No. 394,852.

The dyeing of textiles is frequently carried out by impregnating the textile throughout with the coupling component of an azo dyestuff and overprinting with a paste containing a diazo salt. By reaction of the diazo salt with the coupling component a colored pattern is produced on the textile. The diazo salts incorporated in the printing paste are of various types, such as diazonium halides, reaction products of diazonium halides with zinc chloride or other metallic halides, and reaction products of diazonium halides with aryl sulfonic acids. When incorporated in the printing paste, certain diazo salts deteriorate rapidly, their deterioration being particularly marked by loss in strength of colors made therefrom. Even so short a period of standing as one day has frequently produced so great a change that the paste was no longer useful for its intended purposes.

The object of the invention, which has been accomplished by the invention set forth in this application, was to produce printing pastes which do not deteriorate so swiftly and keep their strength longer. The printing pastes of our invention contain, in addition to the diazo salt and the paste-forming ingredients, an aryl carboxylic acid, or a soluble metallic salt thereof, such as an alkali metal salt thereof. These acids may be substituted in the aryl nucleus by one or more negative groups such as nitro, halogen, trifluoromethyl, and acyl. Other objects of the invention and their method of accomplishment will be in part obvious and in part set forth hereinafter.

The aryl carboxylic acids and their soluble metallic salts which form a constituent of our new printing paste may be mixed with any ingredient of the paste prior to incorporation, or may be mixed with the finished paste. If they are mixed with the diazo component, they can be incorporated therewith prior to or after diazotization.

Exemplary of the aryl carboxylic acids which have been found useful in this invention are terephthalic acid, 4-chloro-benzoic acid, phthalic acid, 2-chloro-benzoic acid, 3-nitro-benzoic acid, nitro-terephthalic acid, 2,6-dichlorobenzoic acid, 2-chloro-4-nitro-benzoic acid, 3-nitro-4-chloro-benzoic acid, diphenic acid, 6-chloro-2-nitro-benzoic acid, trimesic acid, tetra-chloro-ortho'-benzoyl-benzoic acid, 2-chloro-5-nitro-benzoic acid, 3-trifluoro-methyl-benzoic acid, 3,6-di-chloro-2-benzoyl-benzoic acid, 3-nitro-phthalic acid, 5-nitro-salicylic acid, phenyl-acetic acid, 4-nitro-phenoxy-acetic acid, pyromellitic acid, and 2,5-dichloro-benzoic acid.

It has also been determined that the anhydrides of certain of these acids, such as phthalic anhydride, can be effectively used as stabilizers.

This invention is useful when applied to diazo printing pastes containing diazo salts made from any diazotized primary arylamine, examples of which are diazo salts of the benzene, naphthalene, anthracene, stilbene, and diphenyl series.

The following examples illustrate the invention. In these examples parts are by weight and proportions are illustrative of good practice and not limitations:

Example I

The complex diazo salt from diazotized m-chloro-aniline and naphthalene-1,5-disulfonic acid was isolated in the usual manner, dried, and diluted to about 20% strength on an amine basis with benzoic acid and inactive diluents such as sodium sulfate in such a manner that the finished dry salt preparation contained 10% benzoic acid. A printing paste of the following composition was prepared:

| | Grams |
|---|---|
| Diazo salt | 4 |
| Water | 30 |
| Starch-gum tragacanth thickener | 66 |
| | 100 |

When this printing paste was printed from an engraved roller on cotton fiber previously treated with the anilide of 2,3-hydroxy-naphthoic acid, a strong orange color resulted. When the same printing paste was used at successive time intervals for printing in the same manner, the persistence in strength of the resulting colors was far superior to the persistence in strength of those colors obtained from a parallel series of printings in which a paste made from a similar diazo salt preparation containing no benzoic acid was used. The initial strengths of the colors obtained from each of the two pastes were the same, but the paste made from the unstabilized diazo salt lost strength rapidly with accompanying thinning and foaming, while the paste made from the stabilized diazo salt maintained its strength and original physical appearance for much longer periods of time.

*Example II*

Example I was repeated, using 3,5-dinitrobenzoic acid in place of benzoic acid. Similar marked increases in the stability of the diazo salt printing pastes as compared with pastes containing no stabilizer were noted.

Additional experiments carried out in a similar manner on the diazo salts prepared from the following bases also gave increases in the relative stability of the resultant printing pastes: 4-nitro-2-amino-anisole, 3-nitro-4-amino-anisole, 4-chloro-2-amino-toluene, dianisidine, 4-chloro-2-nitro-aniline, 3-nitro-4-amino-toluene, 5-nitro-2-amino-toluene, 4-chloro-2-amino-anisole, and 1-amino-anthraquinone.

The stabilization may be brought about by the use of various amounts of the stabilizing acid in the finished dry diazo salt. We prefer to use amounts of the stabilizer between five and fifteen percent of the finished dry diazo salt. The same result may be obtained by adding the stabilizing acid and the diazo salt separately to the printing paste formula, or by incorporating the stabilizing agent at any stage after the first isolation in the preparation of the diazo salt, or by adding the stabilizing agent to a printing paste prepared by diazotization of the corresponding base. It is not necessary to use the free carboxylic acids, since the water soluble metallic salts such as the alkali metal salts of the acids are usually equally effective in their stabilizing action, and often present more attractive solubility characteristics. The anhydrides of the acids are frequently useful for the purposes of this invention.

The manner of drying the diazo salt, and the diluents used in the finishing of the diazo salt, have no effect on the new printing pastes, provided, of course, that the diazo salt so prepared is otherwise satisfactory for printing purposes. Many diazo salts in common use do not keep their strength in printing pastes for more than a few hours, while the same diazo salts, in many cases, maintain their printing paste strength for several days when included in the pastes of our invention. The invention is of particular value where large amounts of printing pastes are made up at one time, and used over a comparatively long period.

As many apparently widely different embodiments of this invention may be made without departing from the spirit and scope thereof, it is to be understood that we do not limit ourselves to the specific embodiments thereof except as defined in the appended claims.

We claim:

1. A printing paste comprising water, a reaction product of a diazonium halide with an aryl sulfonic acid, and a non-coupling member from the group consisting of aryl carboxylic acids, the soluble metallic salts thereof and their anhydrides.

2. The composition described in claim 1 in which the diazo body is a reaction product of a diazonium halide with naphthalene-1,5-disulfonic acid.

3. The composition described in claim 1 in which the non-coupling member is benzoic acid.

4. The composition described in claim 1 in which the non-coupling member is 3,5-dinitrobenzoic acid.

SWANIE S. ROSSANDER.
CHILES E. SPARKS.
CARL W. MAYNARD, Jr.